US012722217B2

(12) United States Patent
Boehnke

(10) Patent No.: US 12,722,217 B2
(45) Date of Patent: Sep. 1, 2026

(54) CUTTING PLATE AND METHOD AND COMPRESSION MOLD FOR PRODUCING A GREEN BODY OF THE CUTTING PLATE

(71) Applicant: WALTER AG, Tubingen (DE)

(72) Inventor: David Boehnke, Reutlingen (DE)

(73) Assignee: Walter AG, Tubingen (DE)

( * ) Notice: Subject to any disclaimer, the term of this patent is extended or adjusted under 35 U.S.C. 154(b) by 137 days.

(21) Appl. No.: 18/519,336

(22) Filed: Nov. 27, 2023

(65) Prior Publication Data

US 2024/0082931 A1 Mar. 14, 2024

Related U.S. Application Data

(62) Division of application No. 16/613,979, filed as application No. PCT/EP2018/061883 on May 8, 2018, now abandoned.

(30) Foreign Application Priority Data

May 18, 2017 (EP) .................................... 17171734

(51) Int. Cl.
*B23C 5/20* (2006.01)
*B22F 3/03* (2006.01)
(Continued)

(52) U.S. Cl.
CPC ................ *B23C 5/205* (2013.01); *B22F 3/03* (2013.01); *B22F 3/16* (2013.01); *B22F 5/00* (2013.01);
(Continued)

(58) Field of Classification Search
CPC .... B23C 5/205; B22F 3/03; B22F 3/16; B22F 2005/001; B22F 5/00; B22F 2003/033;
(Continued)

(56) References Cited

U.S. PATENT DOCUMENTS 4,060,335 A * 11/1977 Holloway ......... B23B 51/00035 408/233
7,547,166 B2 * 6/2009 Nuzzi ............... B23B 51/00035 408/233
2018/0221967 A1 * 8/2018 McKinley ......... B23B 51/00035

FOREIGN PATENT DOCUMENTS

DE 102015107585 A1 * 11/2016 ............. C23C 28/00
EP 3403817 A1 * 11/2018 ............. B22F 5/006
JP 09290307 A * 11/1997

* cited by examiner

*Primary Examiner* — Sara Addisu
(74) *Attorney, Agent, or Firm* — Corinne R. Gorski

(57) ABSTRACT

A compression tool, a cutting plate and a method of producing a cutting plate by multiaxial pressing a powder mixture of a hard metal component and a binder to form a green body is provided. After pressing, the body has two parallel main surfaces and a peripheral edge surface extending between and connecting the main surfaces. The main surfaces include depressions, such that cutting edges are formed at the intersection of the bottom of the depressions and at least a part of the edge surface. A heading tool includes a main punch and an independently moveable form punch. In a first pressing step, the form punch is moved towards the powder mixture to form a preliminarily compressed portion. In a second step, the main punch and the form punch are both moved towards a final position to provide the green body with its final dimensions including the depressions.

9 Claims, 4 Drawing Sheets

(51) Int. Cl.

| | |
|---|---|
| ***B22F 3/16*** | (2006.01) |
| ***B22F 5/00*** | (2006.01) |
| ***B23B 51/00*** | (2006.01) |
| ***B23F 5/00*** | (2006.01) |
| ***B30B 7/04*** | (2006.01) |
| ***B30B 11/00*** | (2006.01) |
| ***B30B 15/02*** | (2006.01) |

(52) U.S. Cl.
CPC ............ *B23B 51/0003* (2022.01); *B30B 7/04* (2013.01); *B30B 11/007* (2013.01); *B30B 15/022* (2013.01); *B22F 2005/001* (2013.01)

(58) Field of Classification Search
CPC .. B22F 2998/10; B22F 5/006; B23B 51/0003; B23B 51/00035; B30B 7/04; B30B 11/007; B30B 15/022; C22C 29/06
See application file for complete search history.

CUTTING PLATE AND METHOD AND COMPRESSION MOLD FOR PRODUCING A GREEN BODY OF THE CUTTING PLATE

RELATED APPLICATION DATA

This application is a divisional of U.S. patent application Ser. No. 16/613,979 filed Nov. 15, 2019, which is a § 371 National Stage Application of PCT International Application No. PCT/EP2018/076911 filed Oct. 3, 2018 claiming priority to EP 17195198.1 filed Oct. 6, 2017.

TECHNICAL FIELD

The present invention is directed to a method of producing a cutting plate made of hard metal, in particular of sintered carbide, and also discloses a corresponding compression tool and a cutting plate.

BACKGROUND

According to the prior art, a typical compression tool for uniaxial compression is comprised of a die and at least one upper punch (heading tool) vis a vis a lower punch (heading tool). In some cases, the lower punch is fixed and the die and the upper punch may be moveable. According to another method, the die is fixed and the upper and lower punches are moved. In addition, one or several side punches may be provided which are moveable perpendicular to the direction of movement of the upper and/or lower punch. Such tool is a so called multiaxial compression tool. In general, the compression mold and in particular the moveable members of the compression mold are arranged and formed such that for each individual punch any undercuts are avoided, when seen along the respective axes of movements of the moveable members. (cf. EP 2 741 911 B1 and DE 10 2015 107585 A1).

SUMMARY

The method of producing a cutting plate made of hard metal, in particular of sintered carbide, which after pressing includes two substantially parallel main surfaces and a peripheral edge surface extending between the main surfaces at the periphery thereof and connecting the same, which main surfaces include depressions extending at least partly to the edge surface such that cutting edges are formed at the intersection of the bottom of the depressions and at least a part of the edge surface, wherein the powder mixture is supplied to a compression mold having a cavity which is defined by side punches moveable along at least a first direction for forming the edge surfaces and at least one heading punch moveable substantially perpendicular to the first direction for compacting the powder mixture to form a cutting plate green body. The green body may then be sintered according to standard methods known in the art.

A corresponding compression mold for producing plate shaped green bodies by means of multiaxial pressing, wherein the green bodies are formed with two substantially parallel main surfaces and a peripheral edge surface connecting the main surfaces and are comprised of a powder mixture of hard metal and a binder, defines a cavity for receiving the powder mixture and includes at least two side punches moveable towards each other along at least one first direction, mutually facing front faces of the side punches being provided to form at least a part of the edge surface of the green body, wherein one of the side punches may alternatively be replaced by a fixed side wall of a die, and at least one heading tool including at least one punch for compression of the powder mixture along a direction perpendicular to the (first) direction of movement of the side punches in order to form the main surface of the cutting plate.

The cutting plate, which is obtained after sintering the green body and which is prepared by using the aforementioned method and the corresponding compression mold, is designed for drilling or milling The cutting plate is produced from a green body of the above-mentioned powder mixture of hard metal, such as Tungsten Carbide, and a binder metal, such as Cobalt, by means of a corresponding compression tool, wherein after compression the green body includes two substantially parallel main surfaces and a peripheral edge surface connecting the main surfaces, which main surfaces include depressions extending at least partly to the edge surface such that cutting edges are formed at the intersection of the bottom of the depressions and at least a part of the edge surface.

The term “hard metal” as used in the present invention, refers to carbides, oxides and nitrides of elements from groups IVb-VIb of the periodic table, and does not include Iron based alloys such as tool steels or other steel materials. The most popular and most used hard metal in this field is WC.

It may be noted that also the sintered material including the binder is often called “hard metal”, since the above defined hard metal is the dominating component while the binder amounts typically less than 20% and often less than 10%, but still may have a substantial effect on the hardness and toughness properties of the final sintered material.

A typical binder material is cobalt, which may partly or completely be replaced or complemented by iron or nickel or both.

After the green body has been compacted, it is ejected from the compression tool and will be sintered, typically at temperatures between 1300 and 1500° C. for at least 60 minutes.

Upon sintering, the volume of the green body shrinks by an amount of 30%-50% and the linear dimensions become correspondingly smaller when comparing the sintered body to the green body. Typically, the green body has at least two substantially parallel surfaces called “main surfaces” in the present description, which are defining a maximum thickness of the cutting plate in one dimension, i.e., perpendicular to the planes defined by the parallel main surfaces. The periphery of the main surfaces may be polygonal or round or a combination of both, i.e., straight and curved sections forming the edge surface of a corresponding round and/or polygonal body. Generally, the peripheral surfaces extend substantially perpendicular to the main surfaces, but may also be structured or slightly angled with a varying angle different from the 90° angle with respect to the main surfaces.

A local aspect ratio may be defined as a local thickness of the green body over the root of the upper or lower main surface, more precisely the surface area in a projection on a plane defined by the main surfaces, which is perpendicular to the thickness dimension.

Nevertheless, at least for some types of cutting plates having a fairly low local aspect ratio with only little variation over the total main surface (including the depressions), the pressing and sintering processes have been developed over the recent decades such that the amount of shrinking, which also depends on the particular composition of the powder mixture and the pressure applied during compacting, is taken into account when designing the cavity. The finally sintered cutting plate may then have the appropriate and desired dimensions without any further preparation. Nevertheless, in many cases and for particular geometries the cutting edges and also the rake faces require some final preparation and machining, in particular by grinding.

However, in some cases the geometry of a particular cutting plate or cutting plate does not provide appropriate access for a grinding disk, which limits the degree of freedom for the design of cutting edges, rake faces and relief surfaces.

For a cutting plate of the above-mentioned kind, an appropriate pressing of the powder mixture to form a green body which, after sintering, may have the desired dimensions, is a difficult task. The depressions forming cutting edges at the intersection to the edge surface are rather deep when compared to the thickness of the cutting plate outside of such depressions. The thickness, i.e., the distance between points on opposite sides measured perpendicular to the plane defined by the two parallel main surfaces, may vary by a factor of ten or more when compared to the thickness between the main surfaces outside of the depressions. For such cutting plates, the above defined local aspect ratio is thus strongly varying over the main surfaces including the depression therein. This is at least partly due to the desired reduction of the width of the edge surface at least at a position which, in operation, may become the most forward projecting position of the cutting plate when engaging a work piece such as a dead end at a drill tip or a corresponding front end of a milling tool such as an end mill or form cutter.

It has already been attempted to adapt the shape of the front face of the punches in order to provide cutting plates with a strongly varying local aspect ratio. However, this may not be an appropriate solution, because it may result in extremely different degrees of compression of the powder material within the depressions and outside of the depressions, respectively. Substantially different degrees of compression may cause a distortion of the final shape upon sintering due to different degrees of shrinking in different regions of the plate and increase the risk of crack occurrence or pores due to insufficient local compaction. Therefore, the corresponding depressions with a small local aspect ratio, in particular a so-called "web thinning", have heretofore been produced preferably by grinding. However, this necessarily reduces the selection of shapes of any depressions and of corresponding web thinnings to a profile which can be obtained by a respective rotating grinding disk. Grinding also means an extra step in handling and production.

Moreover, it is not possible to generate any further structure, such as additional grooves or ridges or dimples, at the bottom of the depressions by means of a grinding disk. Such additional structures could act as chip breakers in order to break and shape the chips generated in operation such that they can more easily be removed from the working site.

It is thus an object of the present invention to provide a method and device for producing cutting plates of the type defined in the claims, which allow the production of the respective cutting plates with high precision and without grinding just by pressing and sintering. If pressing such cutting plates having rather deep depressions adjacent the cutting edge, it should be possible to give the respective depressions any desired shape corresponding to the inverse structure of the front face of the pressing punch which may include small projections and/or recesses, without any other disadvantages like pores or cracks.

With regard to the method of producing the respective cutting plates, the solution of the afore-mentioned problem is provided by a method as disclosed.

In particular, with the present method a heading tool is used which is moveable perpendicular to and towards the main surfaces, more precisely towards the corresponding surface of the powder mixture filled into the mold cavity, which heading tool is comprised of at least two independently moveable punches, which in the present description are called a form punch and a main punch, respectively. According to the present invention the parallel main surfaces are formed by corresponding flat front surfaces or surface portions of a main punch. The punch movement for pressing is thus also perpendicular to the flat front surface portions of the punch which are recessed when compared to any other front surface portions forming depressions and thus determine the maximum thickness of the cutting plate produced by the movement of the two main punches towards each other to a particular final axial position.

The heading tool includes two parts, one of which is the afore mentioned main punch and the other being an independently moveable form punch, wherein, in a first pressing step, the form punch is moved towards the powder mixture to form a preliminary compressed portion of the green body adjacent the edge surface. The preliminary compressed portion corresponds to a portion provided for a minimal final thickness of the cutting plate. In a second step the main punch and the form punch are commonly moved towards their final position to provide the green body with its final dimensions of all surfaces, including the parallel main surfaces and the depressions formed therein.

With a proper selection of the amount of preliminary pressing, a part of the powder mixture is shifted towards the area forming the thicker portions of the cutting plate so that with the final common pressing operation of the main punch and the form punch the final dimensions of the green body will be produced with substantially the same specific surface load (pressure) especially in the area of transition from the main punch and the form punch.

The different parts of the green body and in particular any transitional area from a smaller to a larger local aspect ratio will then be subject to a similar degree of compression, which avoids a distortion of the general shape and/or cracks and allows a precise prediction of the amount of shrinking upon sintering. The two parallel moveable punches, i.e., the main punch and the form punch enable the operator to adjust an amount of preliminary of pressing by the form punch in relation to the final common pressing by the main punch and the form punch together, such as to provide a homogeneous shrinking without distortion in such transitional areas, which results in a precise final shape of the cutting plate.

In one embodiment, the preliminary pressing and the final compression is performed by means of two identical heading tools which are moved simultaneously towards two oppositely arranged main surfaces of the green body, each of the heading tools comprising at least a main punch and a form punch.

In one embodiment, the pressing to the final dimensions by means of the main punch and the form punch occurs under control of the position of the punches and/or by controlling the forces acting on the punches to provide a similar amount of compaction and/or surface pressure in the area of a transition from the form punch to the main punch.

The term "heading tool" rather than just "punch" is used in the present description, because each heading tool includes (at least) two punches, i.e., the so called main punch and the so called form punch in order to better distinguish these members.

The inverted shape of any projections and recesses on the bottom of depressions maybe machined into the front face of the form punch (and optionally also within some parts of the main punch) with high precision in order to allow pressing of any chip breaking and/or guiding means, i.e., arbitrarily selected structures, into the bottom of any depressions.

Even without generating particular chip breaking structures, it is possible to produce the depressions and thus the cutting edges at the intersection with the edge surface with high precision so that no further grinding, at least not of any depressions and web thinnings, is required. Still, there may be the option that the edge face adjacent the cutting edges is ground because it is easily accessible.

The form punch is thus provided for forming and pressing at least the deepest depressions, in particular a web thinning or other areas defining the minimum thickness of the cutting plate green body. The front faces of the form punches in the closed condition of the cavity may have a minimal distance of less than 1 mm, preferably less than 0.5 mm. In general, the minimal distance will be more than 0.1 mm, but the front faces of the form opposite form punches may even contact each other and for instance produce a small hole through the plate. This corresponds to a minimum thickness of less than 20% preferably less than 10% and in particular less than 6% of the maximum cutting plate thickness (D) measured between the main surfaces outside of any depressions.

With regard to the corresponding tool, i.e., a compression mold for producing plate shaped green bodies, the solution of the above-mentioned problem is provided by two heading tools on opposite sides of the cavity receiving the powder mixture, wherein these sites are representing the main surfaces, wherein each of the heading tools is comprised of two parts, i.e. a main punch and an independently moveable form punch, the cross-section of which extends to the front face of at least one side punch forming the edge surface, wherein the front face of the form punch is independently moveable towards the cavity beyond the front face of the main punch in order to form a depression, in particular a web thinning of the green body.

For the corresponding cutting plate generated by the afore-mentioned method and compression mold, a solution of the problem underlying the present invention is achieved by providing a cutting plate, which is characterized by the fact that the maximum depth of at least one depression in at least one of the main surfaces of the cutting plate is more than 80% of half of the cutting plate thickness, wherein the thickness is defined as the distance between planes defined by the parallel main surfaces and measured perpendicular to these planes.

In one embodiment of the present invention, the corresponding method of production is characterized by the fact that the side punches are closed before the powder mixture is filled into the cavity. The side punches are then forming at least a major part of the edge surface, in particular and preferably that portion of the edge surface forming a cutting edge at the intersection with the bottom of an adjacent depression.

In another embodiment, the method according to the present invention is characterized in that the preliminary pressing and the final pressing occurs by means of two identically formed heading tools, each heading tool comprising two punches and approaching towards the green body or powder mixture simultaneously from opposite sides.

This guaranties the formation of main surfaces, which are substantially identical to each other, in particular as required for cutting plates for drilling, which are symmetric upon rotation by 180° about an axis extending through the center of gravity of the cutting plate along an intermediate plane parallel to the main surfaces and further extending through a tip of the cutting plate which is formed as a dead end connecting the cutting edges on opposite sides of the cutting plate.

Such dead end is a (short) crest, which is formed at the intersection and/or connection of relief surfaces behind the cutting edges, which relief surfaces are forming part of the edge surface and include, in a top view on a main surface, an angle of typically between 100° and 160°. Upon drilling, such dead end is the most forward projecting point of a drilling tool which is pressed into the material and therefore, it is desired to keep such dead end as short as possible without weakening the tip portion of the drill or cutting plate too much. Such recesses reducing the thickness cutting plate near the dead end (thereby reducing the length of the dead end) are also called "web thinnings."

The length of such dead end therefore depends on the depth of the corresponding web thinning. The deeper the depression formed by the web thinning, the shorter the dead end will be and in the present case, the dead end is typically shorter than 3% of the drilling diameter which in turn is defined by the largest dimension of the cutting plate when measured across the main surface perpendicular to the above defined cutting plate axis, which extends through the center of gravity and the dead end.

In view of the independently moveable form punch, there is provided in one embodiment of the present invention a particular control of the axial position of the main punch and the form punch and/or of the compression forces supplied to the same, such that the pressing to the final dimensions by the common movement of the main punch and the form punch occurs with a similar specific surface pressure and a similar amount of compaction.

Another option would be the determination of the pressure or the forces exerted by the individual punches.

"Common movement" of the main punch and the form punch does not necessarily mean that both punches are moved by exactly the same stroke distance. Rather the amount of the stroke during the common movement may be controlled on basis of various parameters, including the amount of the preliminary pressing or the compression forces acting on the green body, which could mean that one of the punches may stop the forward pressing movement slightly before the other.

As already mentioned, in one embodiment there is provided a compression of the green body such as to generate a minimum thickness between bottom surfaces of depressions, which minimum thickness corresponds to less than ⅕ of the cutting plate thickness.

With regard to the compression mold, in one embodiment of the present invention the cross-section of the form punch, when viewed in elevation on the front face thereof, is less than ⅓, and preferably less than ⅕ of the corresponding cross-section of the main punch.

In general, the cross-section of the form punch corresponds to the width and shape of a depression formed into each of the two parallel main surfaces.

In particular, the cross-sectional overlap of the opposite form punches together with the amount of their forward projection beyond the front faces of the respective main punches are determining the length of a dead end, or better to say the minimum distance between oppositely arranged bottom surfaces of depressions. The depressions generated by the form punches are thus defining the so-called "web thinnings" provided at the tip of the cutting plate.

In the closed state, the minimum distance between the opposite form punches may be as small as 1 mm in particular even less than 0.3 mm.

The corresponding cutting plate has thus at least one depression defining a web thinning, the maximum depth of which is more than 80% of half of the maximum cutting plate thickness, which in turn is defined as the distance between the two parallel main surfaces.

It may be noted that any depressions within a main surface may be even deeper than half of the maximum thickness of the cutting plate, as long as such depression is arranged offset from a corresponding depression on the opposite main surface.

The thickness of the cutting plate is typically less than one half of the maximum width or diameter of the cutting plate, which may be defined as the maximum distance between opposite parts of the edge surface measured along a line extending parallel to the main surfaces and the center of gravity.

In one embodiment, the cutting plate is a double sided plate comprising cutting edges at the transition of oppositely arranged edge surfaces to the main surfaces. Such a cutting plate should then be symmetrical with respect to a rotation by 180° about an axis extending perpendicular to the main surfaces and through the center of gravity of the plate.

The cutting plate may also have a central clamping hole extending through the plate between the two main surface. The axis of such hole may extend either perpendicular to the main surfaces or may deviate from such perpendicular extension and include an angle with the main surfaces up to 50°, such as 60°. Alternatively, there may be provided two parallel clamping holes symmetrically arranged on both sides of a plane extending perpendicular to the main surfaces and through the center of gravity and the tip of the plate as formed by the dead end.

In one embodiment, the bottom of a depression or web thinning includes chip breaking and/or chip forming projections and/or recesses, produced by means of compacting the powder mixture by means of the form punch and optionally also by means of (parts of) the main punch, wherein the front faces of the punches are provided with corresponding mold structures.

The individual projections and/or recesses at the bottom of any depression should not exceed dimensions of more than 2 mm in at least one direction In one embodiment, the individual projections or recesses within the bottom of the depressions may have the shape of knobs and/or dimples.

Alternatively, or in addition, some or all of the individual projections or recesses at the bottom of the depressions may have the shape of grooves and/or ribs.

As already mentioned, the maximum depth of a web thinning depression is at least 80% or even 90% of half the thickness of the cutting plates and in preferred embodiments, the maximum depth may even be up to 95 or 96% of half the cutting plate thickness in the area of any web thinnings. The maximum depth of other depressions than the web thinnings may even exceed 100% of half of the plate thickness in areas where corresponding depressions are offset with respect to each other on opposite main surfaces.

In one embodiment, the area at or immediately adjacent the dead end is the thinnest portion of the cutting plate.

The relief surface of the cutting plate, which is a part of the edge surface adjacent a cutting edge, may also be structured, in particular include one or several recessed areas behind a narrow land portion extending along the cutting edge.

Since the edge surfaces and in particular the parts forming the relief surfaces are at least partly formed by the side punches, also any structures or recesses of the relief surfaces may be formed by the side punches.

In another embodiment, a mounting hole extends through the cutting plate from one main surface to the other at an angle with respect to the plane of the main surfaces, in particular within a range from 50° to 90°, preferably 50 to 80° and in particular 60° to the main surface plane.

In general, minor cutting edges are provided by the transition of two oppositely arranged side edge faces to a respective one of the main surfaces, which minor cutting edges are substantially parallel to the above defined axis of symmetry extending through the dead end. Thereby forming a cutting corner with the adjacent main cutting edge and defining the radius of a hole to be drilled by a tool equipped with such cutting plate. Alternatively, there may also be formed a continuous rounded transition from the main cutting edges to the adjoining minor cutting edges.

Further features and advantages of the cutting plates and the corresponding methods and devices for their production may become more apparent from the following description of preferred embodiments and the associated figures.

DETAILED DESCRIPTION

Figure 1:
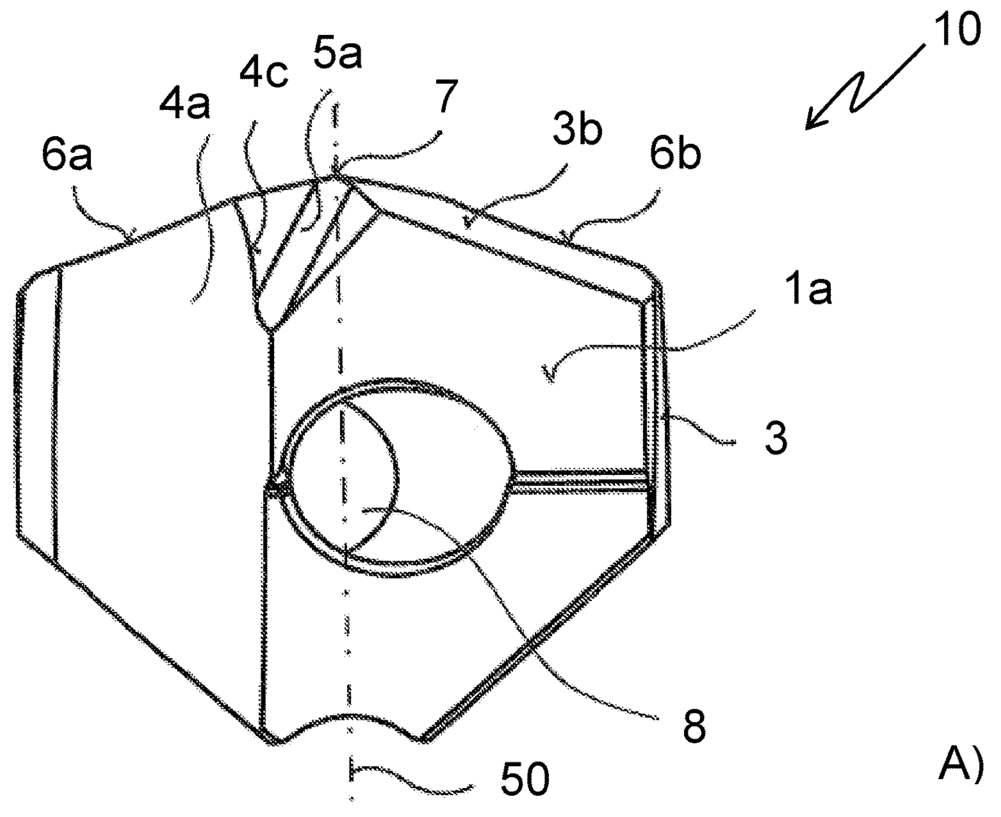
FIGS. 1A and 1B are a planar side view and a front view, respectively, on a cutting plate according to the present invention, designed as a drilling plate having an axis of symmetry.
Figure 1:
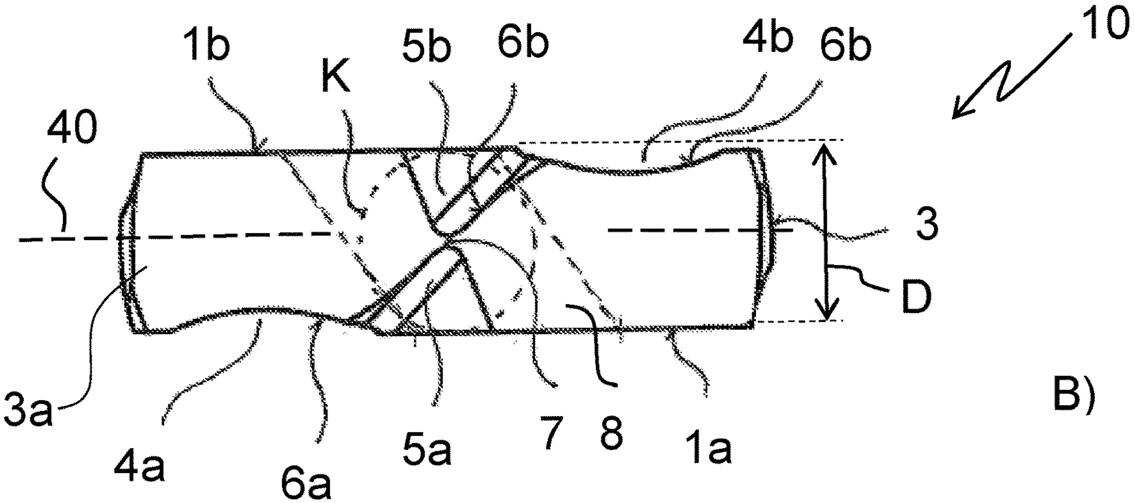

Referring to FIG. 1A, there is shown a plan view of a cutting plate 10 on one of the main surfaces 1*a*, 1*b*. In the plan view, the cutting plate occurs as a polygonal body with a symmetry axis 50 extending through the center of gravity and the dead end 7 at the tip of the cutting plate in an intermediate plane 40 parallel to the main surfaces 1*a*, 1*b* and shown as a dashed dotted line.

As visible in FIG. 1B, the cutting plate has two generally planar and parallel main surfaces 1*a*, 1*b*, wherein both of these main surfaces are comprising depressions 4*a, b* and web thinnings 5*a, b* respectively, adjacent the edge surface portions 3*a*, 3*b*. The complete edge surface connecting the top and bottom surfaces 1*a*, 1*b* and surrounding the cutting plate and including the edge surface portions 3*a*, 3*b* is denoted by reference numeral 3. The depression 4*a* is formed as a chip groove extending along a cutting edge 6*a*, which is formed and defined by the intersection between the bottom of the chip groove 4*a* and the edge surface portion 3*a*. A similar chip groove 4*b* is provided on the opposite side

1*b* of the cutting plate and the bottom of this chip groove 4*b* forms a cutting edge 6*b* at the intersection with the edge surface 3*b*. The edge surface portions 3*a*, 3*b* are effectively forming relief surfaces and therefore, these edge surface portions do not extend exactly perpendicular to the main surfaces 1*a*, 1*b* but are slightly angled such as to provide a sufficient relief angle behind the cutting edges 6*a*, 6*b*.

Depressions 4*a*, 4*b* are forming chip grooves adjoining the radial outer portions of cutting edges 6*a*, 6*b*. The depressions 5*a*, 5*b* are formed as web thinnings adjoining the radial inner portions of cutting edges 6*a*, 6*b*, i.e., they are approaching each other from opposite sides 1*a*, 1*b* to reduce the length of the dead end 7, which is formed as a crest at the tip of the cutting plate, which crest is formed by the intersection of the relief surfaces 3*a*, 3*b*. As will be seen from FIG. 1B, the cutting plate 10 is symmetric with respect to a rotation by 180° about an axis 50 extending through a center of gravity of the cutting plate and the center of the dead end 7, i.e., within the middle plane 40 which is an imaginary plane in the middle between the planes defined by the main surfaces 1*a* and 1*b*, respectively.

The cutting plate 10 may have a central clamping hole 8 with an axis extending at an angle equal to or deviating from 90 with respect to the main surfaces 1*a*, 1*b* in particular at an angle of 50 to 80°, such as about 60° as shown by dashed lines in FIG. 1B. However, even without a central clamping hole 8, the cutting plate 10 may be clamped by the walls of a slot provided at the front end of a corresponding tool shaft.

Figure 3:
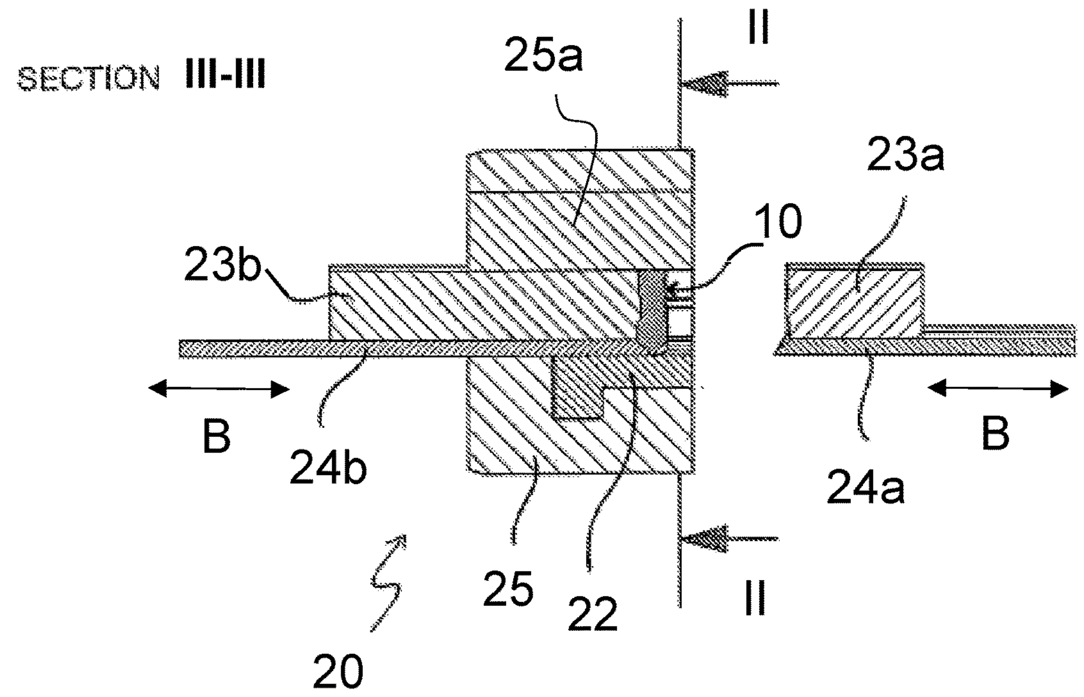
FIG. 3 is a cross-section corresponding to the line III-III in FIG. 2.
Figure 2:
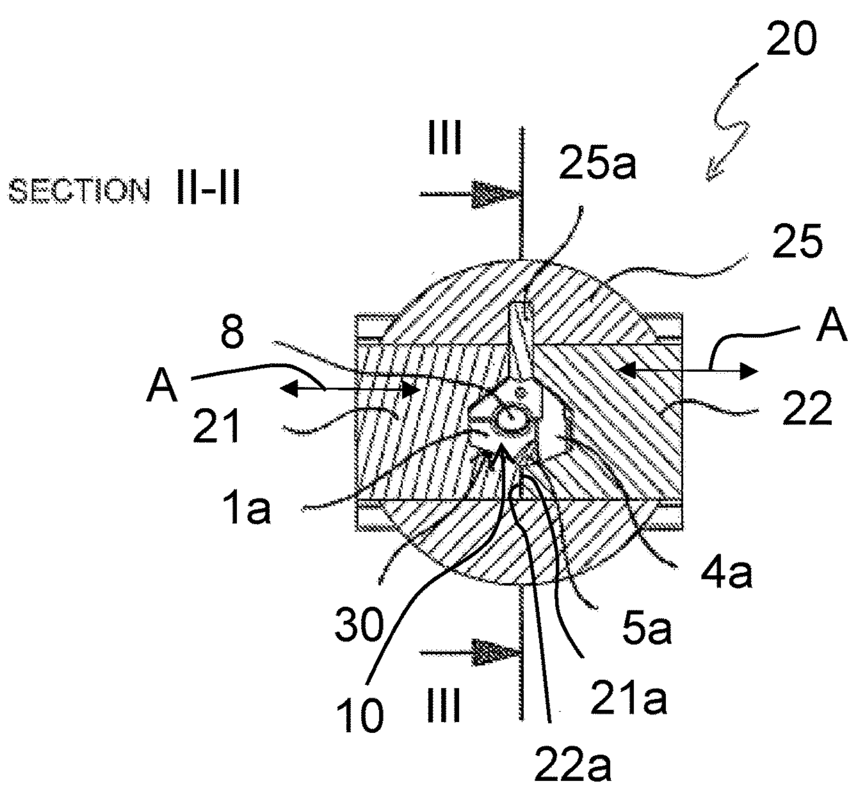
FIG. 2 is a cross-section taken along line II-II in FIG. 3, of a compression tool defining a cavity with a section parallel to the main surfaces of the cutting plate formed in such cavities.
Figure 4:
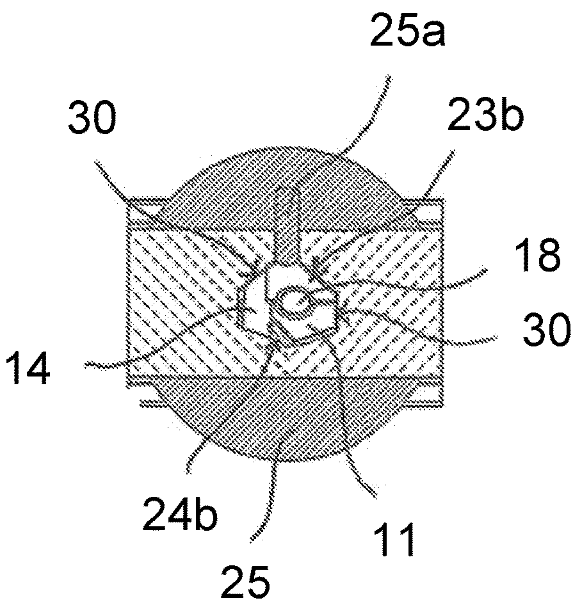
FIG. 4 is a cross-section through the compression tool similar as FIG. 2, but without a cutting plate.

The compression tool 20 is shown and described in connection with FIGS. 2 to 4. FIG. 2 is a cross-section through the cavity of a compression tool 20 for pressing the corresponding green body 10, with a section along lines II-II in FIG. 3. FIG. 2 also shows a planar side view on the cutting plate 10 after pressing, corresponding to FIG. 1A. FIG. 3 is a cross-section according to section line III-III in FIG. 2 including a cutting plate received in the cavity of the tool. FIG. 4 is a similar cross-section through a compression tool as FIG. 2, but without a cutting plate located therein, such that the front faces of the main punch and form punch of the lower heading are visible.

The cavity 30 shown is formed by a die insert 25*a*, inserted in a slot of an inner surface of a die 25, two side punches 21, 22 movable along arrows A, and an upper and a lower heading each being comprised of a main punch 23*a*, 23*b*, respectively, and a form punches 24*a*, 24*b*, respectively. Before filling the cavity 30, the two side punches 21, 22 are closed, i.e. they are moved towards each other until they abut each other and/or the die insert 25*a* with their oppositely arranged faces 21*a*, 22*a*.

As shown in FIG. 3, the upper and lower form punches 24*a,b* are then moved along arrows B perpendicular to the arrows A (shown in FIG. 2), wherein the periphery of the combined punches 23*a,b*, 24*a,b* fit into the cavity space formed between the side punches 21, 22 and die insert 25*a*.

The cavity 30 is then filled with a powder mixture of a hard metal component, such as WC and a binder, such as cobalt. Thereupon, the upper tooling head will be moved downward towards the cavity 30 until there is a slight contact with the upper surface of the powder mixture by the form punch and optionally also by the main punch. Before contacting the powder mixture, the form punch 24*a* may be flush with or partly projecting beyond the front surface of the main punch 23*a*. In the next step, both form punches 24*a*, 24*b* will be moved towards each other along the arrows B visible in FIG. 3 until a certain amount of preliminary compression is obtained between the two form punches 24*a*, 24*b*, adjacent the front faces of one or both of side punches 21, 22, because the form punches are designed and provided for forming the web thinnings 5*a, b* visible in FIG. 1B and extend to the edge surfaces 3*a*, 3*b*. The amount of such preliminary pressing, i.e., the final position of the form punches 24*a,b* reached in the preliminary pressing step and optionally or alternatively the corresponding pressing force required therefor has to be determined by experiments and/or simulations since it depends on the composition of the powder mixture and also on the ratio between the thinnest and thickest portions of the cutting plate.

In the next step, also the main punches 23*a*, 23*b* are moved towards each other in order to compress the powder mixture along the axis defined by the arrows B. Before the final amount of compression is reached, both pairs of punches, namely the main punch 23*a* and the form punch 24*a* as well as the lower main punch 23*b* and the lower form punch 24*b* are moved in unison towards the oppositely arranged tool, until a desired position and compaction is reached. Optionally, also the forces acting on the punches 23*a,b* and 24*a,b* may be considered and adapted such that a similar pressure acts on the green body along the whole upper and lower surface 1*a* and 1*b* including the depressions 4*a*, 4*b* and web thinnings 5*a*, 5*b*.

A typical compression cycle takes between 1 and 10 seconds, and thereafter the upper heading and the side punches may be removed, whereupon the green body can be ejected from the cavity, for instance by moving the lower tool 23*b*, 24*b* upward.

A portion 14 of the main punches 23*a*, 23*b* slightly projecting over the front face 11 and forming the chip grooves 4*a*, 4*b* on either side of the cutting plate is visible in FIG. 4. For deep chip grooves 4, the portion forming 14 might also be provided on the front face of the form punch 24*a, b*.

While FIG. 1A appears to show a border line 4*c* between the chip groove 4*a* and the web thinning 5*a*, there may in general be just a smooth transition between the respective depressions 4*a*, 5*a*. According to a standard definition for twist drills, the web thinning corresponds to any removed portion or recess within a central core which is not affected by any chip groove over the length of a cutting portion which in turn is defined by the axial length of the chip grooves. In FIG. 1B, a corresponding circle K is shown by a dashed line having a diameter corresponding to the maximum thickness of the cutting plate. Accordingly, removed material within a cylinder defined by the dashed circle K may be identified as a web thinning 5*a*, 5*b*.

Still, the cross-section of the form punch 24*a*, 24*b* may extend beyond the dashed circle K to the periphery of the depression 5*a*, 5*b* including the line 4*c* in the upper part of FIG. 1A, while a projection 14 extending from the otherwise planar front surfaces 11 of the main punches 23*a*, 23*b* may be provided for the generation of the chip grooves 4*a*, 4*b* and again be delimited by line 4*c*.

Figure 5:
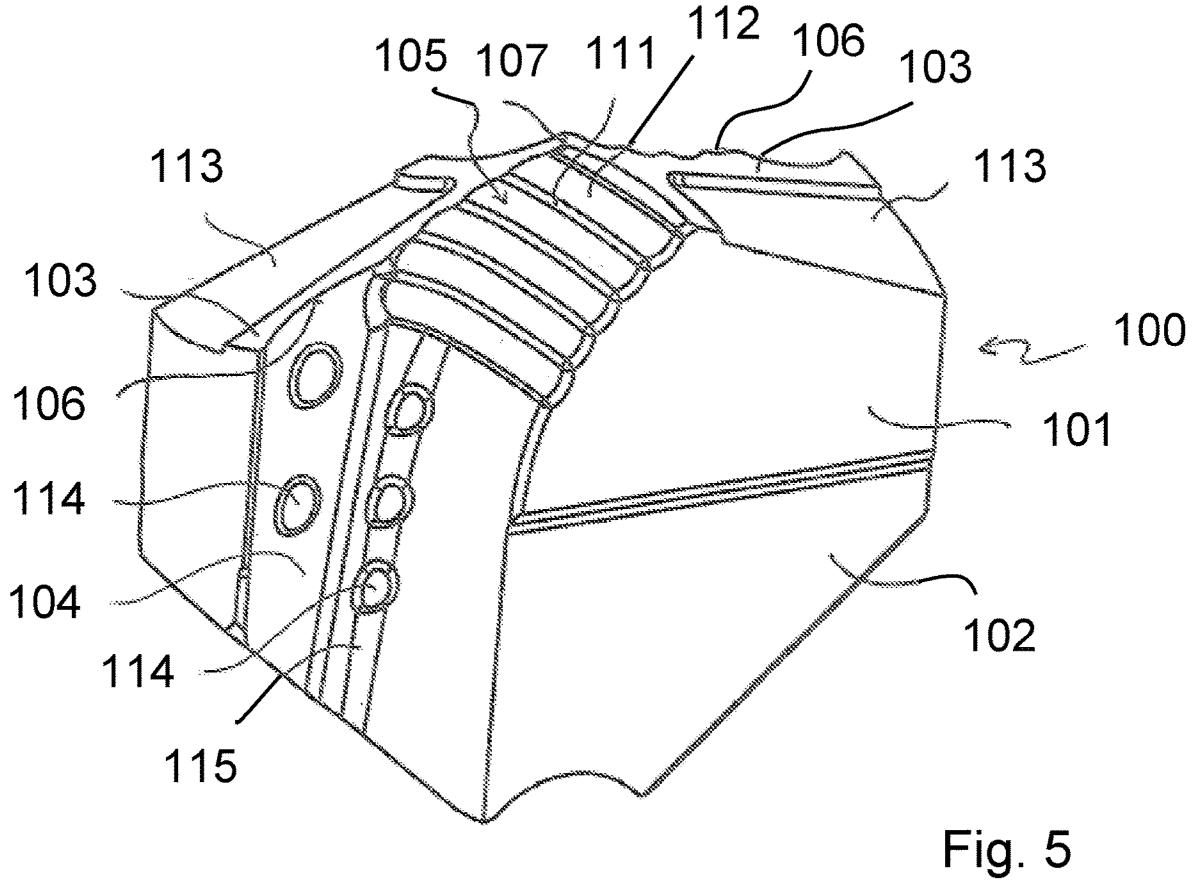
FIG. 5 is another embodiment of a cutting plate according to the present invention.

FIG. 5 shows another embodiment of the present invention including some additional modifications. Reference numerals in FIG. 5 are modified with respect to the previously described embodiment by adding just 100 for the respective equivalent features. For the ease of description, the same reference numerals are used for the identical features and elements on either side of the cutting plate 100.

Again, the cutting plate 100 includes two main surfaces 101, (wherein only one is visible) and recesses or depressions 104, 105 from the main surfaces 101, wherein the depressions 104 are indicated and act as chip grooves or chip flutes, while a recess 105 adjacent the dead end 107 is a web thinning because for the generation of this web thinning, material has to be removed from the core of the cutting plate 100 which otherwise is not affected by depressions like the chip grooves 104.

In addition, relief surfaces adjacent cutting edges 106 are formed as relatively narrow lands 103 followed by relief recesses 113 axially retracted with respect to the lands 103 adjacent the respective cutting edges 106.

For the production of such a cutting plate, the front faces of the side punches or a single side punch may be shaped such as to form both, lands adjacent the cutting edges 106, which are forming relief surfaces 103, as well as the relief recesses 113. The dead end 107 is much shorter than a corresponding crest which might extend over the whole width of the cutting plate if no web thinning 105 would be provided. The web thinning 105 further includes grooves 112 having an arc shaped bottom and ridges 111 there between extending from the respective main surfaces 101 to the cutting edges 106, so that the cutting edge 106 has a wavy shape adjacent to the web thinning and the dead end.

Also, the radial outer portion of the cutting edges 106 is slightly curved due to the curved bottom of the respective chip groove 104 intersecting with the relief surfaces 103. Accordingly, the cutting edges 106 are formed by the transition from the depressions, more precisely the chip groove 104 and web thinnings 105, to a relief surface formed by the lands 103.

In addition, chip breaking structures like the knobs 114 and ribs 115 may be provided at the bottom of the chip grooves 104 and also the grooves 112 and ridges 111 forming the bottom of the web thinning 105 are acting as chip formers and chip breakers.

With the embodiment shown in FIG. 5, the actual length of the dead end 107 is only about 3% to 8% of the thickness D of the cutting plate. Without such web thinning the length of the dead end 107 would be at least the distance between the parallel main surfaces 101.

Figure 6:
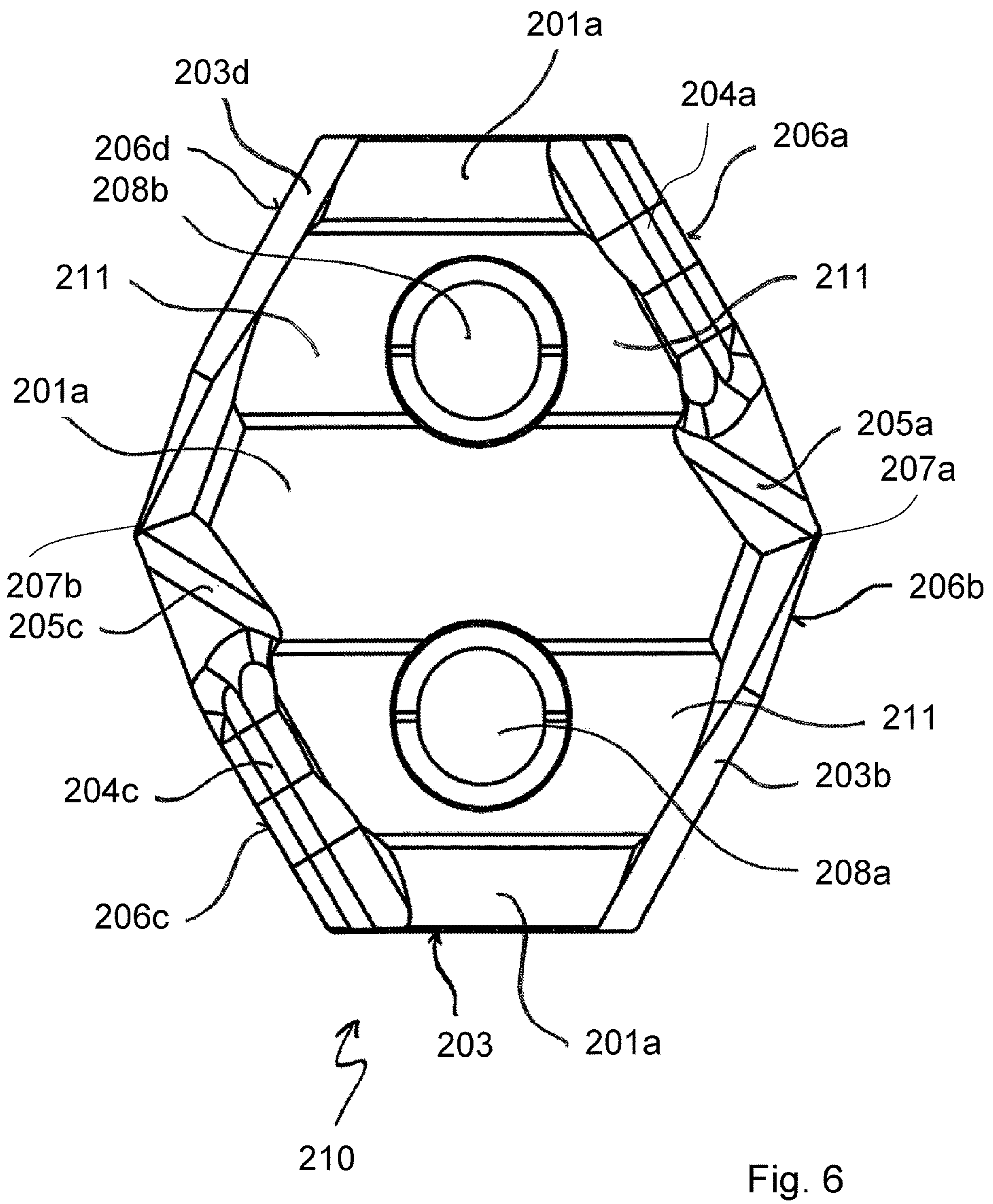
FIG. 6 is a double-sided cutting plate according to the present invention.

FIG. 6 shows another embodiment of the present invention, which is configured as a double-sided cutting plate, which is designated by reference numeral 210.

The last two digits of the reference numerals used in FIG. 6 are similar or the same as those used for the previous description of FIGS. 1 to 5, wherein just a leading number 2 is used as a prefix.

In agreement with the previous embodiment, the cutting plate 210 is comprised of a body having two parallel top and bottom surfaces, wherein only the top surface 201*a* is visible in FIG. 6, while the opposite side has exactly the same appearance if the cutting plate 210 is turned around by 180°. Accordingly, it is sufficient to describe the cutting plate 210 only by the view shown in FIG. 6. The double-sided cutting plate 210 includes two tips having short dead ends 207*a* and 207*b*, respectively, on oppositely arranged edge surfaces, more particular at the transition from an inner end of a cutting edge 206*a* to a cutting edge 206*b* on the opposite main surface. Web thinnings 205*a* and 205*c* form, together with further web thinnings on the opposite main surface (not visible), the inner portions of cutting edges 206*a*, 206*b*, 206*c*, 206*d* at the transition to the respective edge surfaces 203*b*, 203*d* (the remaining edge surface portions are not visible) and leave a dead end 207*a*, 207*b* connecting the inner ends of the respective cutting edges. The main surface 201*a* is comprised of a central portion and two outer portions, wherein slight concave depressions 211 are arranged between the planar central portion and each of the planar outer portions of the main surface 201*a*. Two mounting holes 208*a*, 208*b* extend from the main surface 201*a* to the opposite main surface (not visible), wherein a major part of the mounting holes extends through the bottom of the slightly concave depressions 211. Chip grooves 204*a, c* are visible on diagonally opposite sides of the main surface 201*a*.

The cutting plate 210 is symmetrical with regard to a rotation by 180° about either a horizontal axis extending through the dead ends 207*a*, 207*b*, a vertical axis extending through the center of the mounting holes 208*a*, 208*b* and also about a central axis perpendicular to the main surface 201*a*, extending through the plate at the position where the other two axes of symmetry cross each other.

When inserted within a slot at the front end of a corresponding cutting plate holder to be used as a drill, one of the tips or dead ends 207*a*, 207*b* is inactive while the other tip is projecting in the forward direction from the slot and is used as the tip of a drill. When the cutting edges 206*a*, 206*b* of the corresponding tip 207*a* are worn out, the cutting plate may be dismounted and turned around and again mounted within the slot of the cutting plate holder such that the cutting tip 207*b* is projecting in the forward direction and cutting edges 206*c* and 206*d* are becoming the active cutting edges.

The cutting plate is mounted within a slot at the front end of a tool holder, wherein mounting screws are guided through holes provided in the wall of a tool holder limiting the slot and extend through the mounting holes 208*a*, 208*b* into threaded holes provided in the wall of the cutting plate holder limiting the other side of the slot.

For the purpose of original disclosure it is to be noted that any features which may be gathered by a skilled person from the present description, the drawings and the claims, even if only described in connection with particular further features, may be combined individually as well as in arbitrary combinations with any other of the features or groups of features disclosed herein, unless this is explicitly excluded or technical conditions would render such combinations impossible or senseless. The comprehensive, explicit discussion of any combinations of features which might be thought of is dispensed with just for the sake of brevity and legibility of the description and claims.

What is claimed is:

1. A cutting plate for drilling or milling made by a compression tool, the compression tool being configured to:

multiaxially press a powder mixture of a hard metal component and a binder to form a green body; and sinter the green body, which after pressing includes two substantially parallel main surfaces and a peripheral edge surface extending between the main surfaces at a periphery thereof and connecting the same, the two, parallel main surfaces each including depressions extending at least partly to the peripheral edge surface such that cutting edges are formed at an intersection of a bottom of the depressions and at least a part of the edge surface, wherein the powder mixture is supplied to a compression mold having a cavity, which is defined by side punches moveable along at least a first direction for forming the edge surfaces and at least one heading punch moveable substantially perpendicular to the first direction for compacting the powder mixture to form a cutting plate green body, wherein a heading tool is used, which is moveable perpendicular to and towards the main surfaces, the heading tool including two parts, one of the parts being a main punch and the other part being an independently moveable form punch wherein the pressing step includes a first pressing step wherein the form punch is moved towards the powder mixture to form a preliminarily compressed portion of the green body adjacent the peripheral edge surface and including an area designated to become an area of a minimal final thickness of the green body, and a second pressing step wherein the main punch and the form punch are both moved towards a final position to provide the green body with its final dimensions of the parallel main surfaces including the depressions, wherein the depressions are provided at the bottom thereof with chip-breaking and/or chip-forming projections and/or recesses as produced only by the pressing of the powder mixture into the green body.

2. The cutting plate according to claim 1, wherein a thickness of the plate is less than one half of a maximum diameter of the plate as measured through a center of gravity and parallel to the planes defined by the main surfaces.

3. The cutting plate according to claim 1, wherein the cutting plate is a double sided plate including cutting edges at a transition of oppositely arranged edge surfaces to the main surfaces.

4. The cutting plate according to claim 1, wherein a ratio of the minimum distance between the bottom of depressions on opposite main surfaces, in an area of the web thinning, when compared to the maximum plate thickness is less than 1/10.

5. The cutting plate according to claim 1, wherein the bottom of at least one depression or web thinning includes chip breaking and/or chip forming projections and/or recesses, individual projections or recesses within the bottom of the depressions having a shape of knobs and/or dimples and/or of grooves and/or ribs.

6. The cutting plate according to claim 5, wherein the individual projections and/or recesses at the bottom of any depression do not exceed a dimension of more than 2 mm in at least one direction.

7. The cutting plate according to claim 1, wherein the cutting plate is symmetric with respect to rotation by 180° about a central axis extending in an intermediate plane between the main surfaces and parallel thereto through the center of gravity and the center of a dead end at a tip of the cutting plate.

8. The cutting plate according to claim 7, wherein a thinnest area of the cutting plate is an area of the dead end.

9. The cutting plate according to claim 1, wherein at least one depression on either side is the web thinning, wherein the web thinnings on opposite sides of the main surfaces are arranged such that a lowermost point of the at least one depression is approaching a same position on the edge surface.

* * * * *